United States Patent

Setani

Patent Number: 5,223,703
Date of Patent: Jun. 29, 1993

[54] IMAGE READER WITH COLOR DECOMPOSING BLAZED DIFFRACTION GRATING

[75] Inventor: Michitaka Setani, Kawasaki, Japan

[73] Assignee: Canon Kabushiki Kaisha, Tokyo, Japan

[21] Appl. No.: 645,709

[22] Filed: Jan. 25, 1991

[30] Foreign Application Priority Data

Jan. 30, 1990 [JP] Japan ................... 2-20320

[51] Int. Cl.$^5$ .................................... H01J 40/14
[52] U.S. Cl. ........................... 250/208.1; 250/226; 359/571
[58] Field of Search ............. 250/208.1, 208.2, 226; 359/566, 569, 571, 618; 358/213.11, 482, 483, 494

[56] References Cited

U.S. PATENT DOCUMENTS

| | | | |
|---|---|---|---|
| 4,277,138 | 7/1981 | Dammann | 350/162 R |
| 4,554,460 | 11/1986 | Klein | 250/208.1 |
| 4,650,988 | 3/1987 | Suzuki et al. | 250/208.1 |
| 4,963,464 | 10/1990 | Setani | 430/495 |
| 4,991,030 | 2/1991 | Sato et al. | 358/474 |
| 4,998,806 | 3/1991 | Tsuji et al. | 359/619 |

FOREIGN PATENT DOCUMENTS

| | | |
|---|---|---|
| 0240000 | 10/1987 | European Pat. Off. |
| 0383308 | 8/1990 | European Pat. Off. |
| 2645075 | 4/1978 | Fed. Rep. of Germany |

*Primary Examiner*—David C. Nelms
*Attorney, Agent, or Firm*—Fitzpatrick, Cella, Harper & Scinto

[57] ABSTRACT

An image reader comprises a monolithic 3-line sensor having three one-dimension sensor arrays such as solid-state imaging devices arranged on one substrate with each array being spaced by a predetermined distance along a direction perpendicular to the array direction, a focusing optical system for focusing an image of an object onto the sensor, and a one-dimension blazed diffraction grating arranged in a light path between the focusing optical system and the sensor, closer to the sensor than to an exit pupil of the focusing optical system for spectroscopically separating a light from one point on the object by a diffraction effect to color-decompose it into three colors perpendicularly to the array and directing the color-decomposed lights to the corresponding sensor arrays. Distances from a center sensor array of the 3-line sensor to two other sensor lines are different from each other.

12 Claims, 4 Drawing Sheets

SUB-SCAN CROSS SECTION

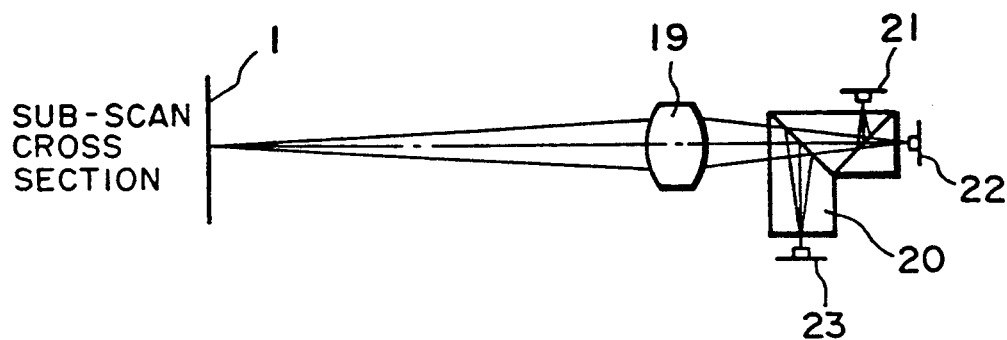
FIG.1
(PRIOR ART)
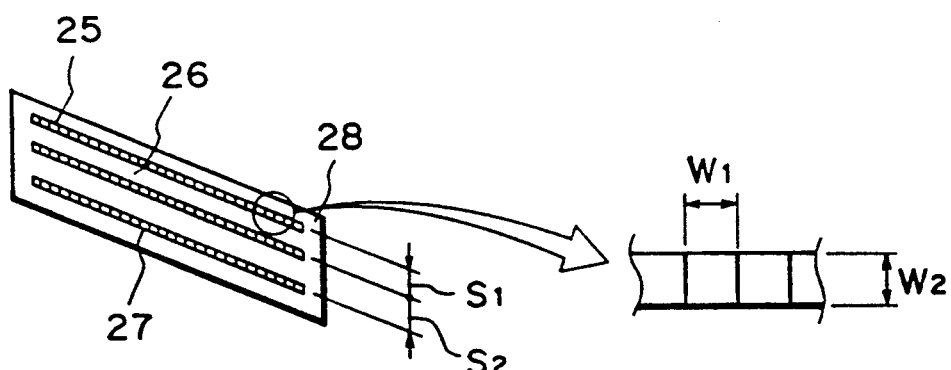
FIG.2A
(PRIOR ART)
FIG.2B
(PRIOR ART)

IMAGE READER WITH COLOR DECOMPOSING BLAZED DIFFRACTION GRATING

BACKGROUND OF THE INVENTION

1. Field of the Invention

The present invention relates to an apparatus for reading a color image by using a solid-state imaging device or the like, and more particularly to a color image reader which directs light from an object to a sensor, such as a solid-state imaging device, through a focusing optical system and color decomposition means.

2. Related Background Art

A prior art apparatus, which line-scans an object such as a document sheet in a sub-scan direction and color-reads an image thereof by a solid-state imaging device (such as CCD) array is shown in FIG. 1. In FIG. 1, an information light on a portion of a document sheet 1, illuminated by a light from an illumination light source (not shown), is decomposed and separated into three colors by a three-pieces (3p) prism 20 through an imaging optical system 19, and focused to and read by three one-line CCD sensors 21, 22 and 23.

In the prior art apparatus, three independent sensors are required. Further, since the 3p prism 20 requires high precision to manufacture, its cost is high. In addition, adjustment of the focusing light beam and the sensors 21, 22 and 23 is required for each of the three sensors and the difficulty in its manufacture is high.

It has been proposed to arrange three one-line sensors in parallel on one substrate with a predetermined spacing therebetween so that they functions as a monolithic 3-line sensor.

Such a 3-line sensor 24 is shown in FIG. 2A. Spacings $S_1$ and $S_2$ between the three lines 25, 26 and 27 are, for example, 0.1–0.2 mm by various manufacturing conditions. Widths $W_1$ and $W_2$ of a single element 28 as shown in FIG. 2B are, for example, 7 $\mu$m $\times$ 7 $\mu$m and 10 $\mu$m $\times$ 10 $\mu$m.

A known color image reader, which uses such a monolithic 3-line sensor as the photo-sensing device, is shown in FIG. 3. In FIG. 3, when information on a document sheet 1 is read by line-scan along a sub-scan direction, light from the document sheet 1 is focused through optical system 29 and decomposed and separated into three light beams of three colors by color decomposing beam splitters 30 and 31, having dichroic selective transmission films applied thereto, and are focused onto line-elements on the monolithic 3-line sensor 32.

As shown in FIG. 3, where a thickness of the beam splitters 30 and 31 is X, a line-to-line distance on the sensor 32 is $2\sqrt{2}X$. Thus, if the line-to-line distance ($2\sqrt{X}$) is 0.1–0.2 mm as described above, the thickness (X) is 35–70 $\mu$m. This thickness is not easy to manufacture when a required flatness of the plane is taken into consideration.

On the other hand, distances between the center line 26 of the monolithic 3-line sensor and two other lines 25 and 27 are usually equal and integer multiples of a pixel size in the sub-scan direction ($W_2$ in FIG. 2B).

The reason is as follows. As seen from FIG. 4A. when the image is read by the monolithic 3-line sensor by using only a conventional focusing optical system 45, three positions 25', 26' and 27' (FIG. 4A) on the document sheet are simultaneously read by the three lines 25, 26 and 27. Since three color (R, G, B) signal components for one point are not simultaneously read, it is necessary to collate and compose them after reading.

Where the line-to-line distances $S_1$ and $S_2$, as shown in FIG. 4B, are integer multiples of the pixel size and a redundancy line memory is provided to delay the G and R signals, for example, relative to the B signal, the three-color composition is attained relatively easily. For this reason, the integer multiple distance is selected. However, since a redundant line memory is required for each line-to-line distance, a plurality of expensive line memories are required. This is disadvantageous from a cost standpoint, and an inexpensive color reader cannot be provided.

A color image reader which uses a blazed diffraction grating as a color decomposition means is disclosed in U.S. Pat. No. 4,277,138 (counterpart DE 2,645,075).

However, it pays no attention to the construction of a sensor which reads an image of an object.

SUMMARY OF THE INVENTION

It is an object of the present invention to provide an inexpensive and high performance color image reader.

In order to achieve the above object, the image reader of the present invention comprises a monolithic 3-line sensor having three one-dimension sensor arrays, such as solid-state imaging devices, arranged on one substrate with each array being spaced by a predetermined distance along a direction perpendicular to the array direction. The present invention further comprises a focusing optical system for focusing an image of an object onto the sensor, and a one-dimension blazed diffraction grating, arranged in a light path between the focusing optical system and the sensor, closer to the sensor than to an exit pupil of the focusing optical system, for spectroscopically separating light from one point on the object by a diffraction effect to color-decompose it into three colors perpendicularly to the array and directing the color-decomposed lights to the corresponding sensor arrays. Distances from a center sensor array of the 3-line sensor to two other sensor lines are different from each other.

More specifically, the distances from the center sensor array to the two other sensor arrays correspond to separation distances from the center sensor, array on the 3-line sensor which are primarily determined by a wavelength at a maximum diffraction efficiency of two $\pm$1-order diffracted lights of the one-dimension blazed diffraction grating.

The one-dimension blazed diffraction grating may be of reflection type or transmission type.

In this manner, the restriction to keep the line-to-line distances of the sensor equal to each other and to an integer multiple of the pixel size is eliminated and an inexpensive and high performance line scanning digital image reader is provided.

BRIEF DESCRIPTION OF THE DRAWINGS

FIG. 1 shows a prior art apparatus,
FIG. 2A shows a construction of a monolithic 3-line sensor,
FIG. 2B shows a single element of one of the lines of the 3-line sensor.

DETAILED DESCRIPTION OF THE PREFERRED EMBODIMENTS

Figure 3:
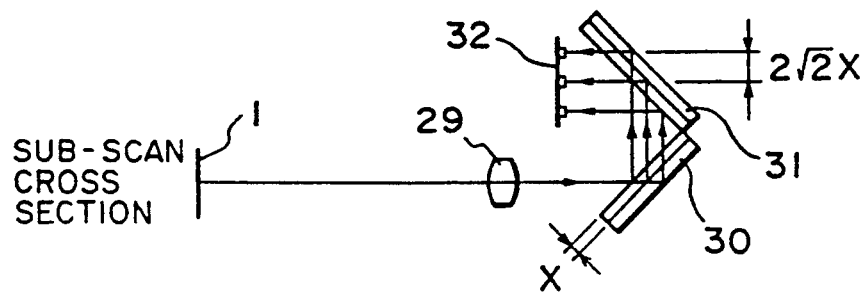
FIG. 3 shows another prior art apparatus.
Figure 4A:
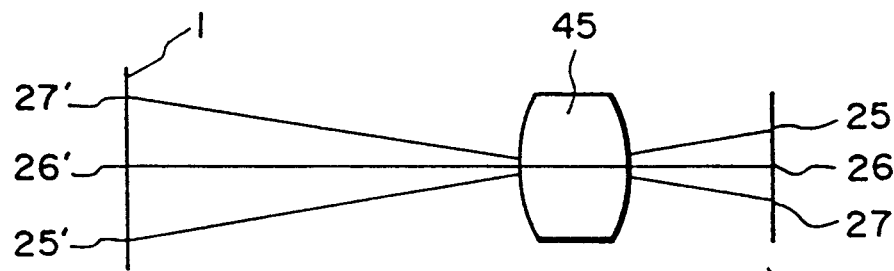
FIG. 4A illustrates prior art 3-line reading.
Figure 4B:
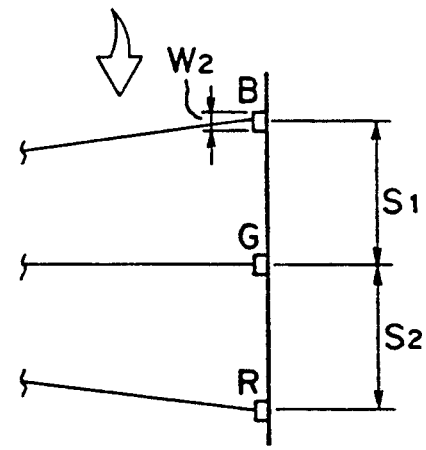
FIG. 4B illustrates a side view of a prior art 3-line reading.
Figure 5A:
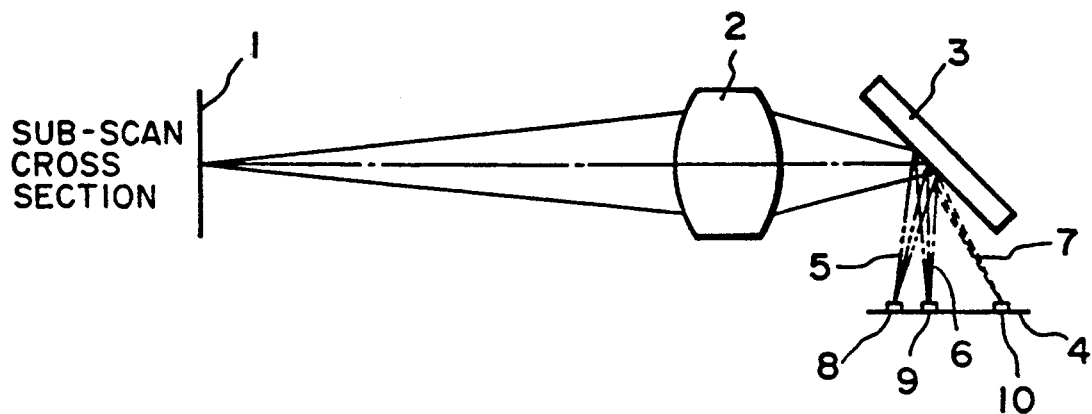
FIG. 5A shows a sub-scan sectional view of a first embodiment of the present invention.

FIG. 5 shows a first embodiment of a color image reader of the present invention. FIG. 5 shows a sectional view along a sub-scan which is perpendicular to a main scan cross-section. In FIG. 5, image information of a document sheet 1 as an object is line-scanned in a sub-scan direction (vertical direction on the sheet of FIG. 5A) by a mirror (not shown), which is arranged between the document sheet 1 and a focusing optical system 2, and the image information light is directed to a 3-color decomposing reflection type one-dimension blazed diffraction grating 3 through the focusing optical system 2. The information light from one point (one line) on the document sheet 1 is separated laterally, as in FIG. 5A, into three-color (R, G, B) light beams 5, 6 and 7 in the so-called color reading, by reflection diffraction, and they are focused onto sensor arrays or line sensors 8, 9 and 10 on a monolithic 3-line sensor 4. The document sheet 1 and the image reader (focusing optical system 2, diffraction grating 3 and sensor 4) are relatively moved in the sub-scan direction to sequentially read the image information of the document sheet 1.

The sensor arrays 8, 9 and 10 on the sensor 4 extend in the main scan direction normal to the sheet of FIG. 5A. The sensor 4 is a monolithic 3-line sensor having three one-dimension sensor arrays arranged on one substrate with the arrays spaced from each other in a direction (main scan direction) perpendicular to the array direction by a predetermined distance.

The one-dimension blazed diffraction grating 3 is arranged in a light path between the focusing optical system 2 and the sensor 4, closer where it is to the sensor 4 than to an exit pupil of the focusing optical system 2, to color-decompose the light from the object and direct the color-decomposed lights to the corresponding sensor arrays.

The document sheet 1 is illuminated by an illuminating light source (not shown) and the image information is read by the image reader.

Figure 5B:
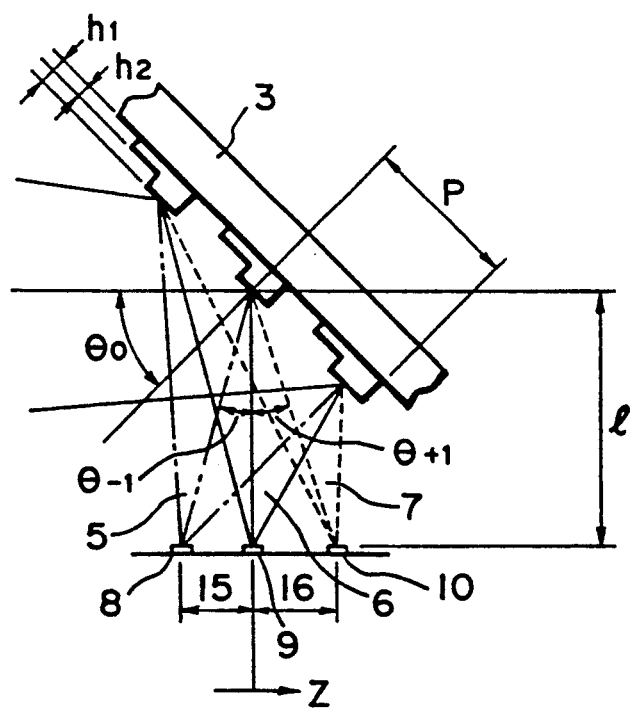
FIG. 5B shows a partial enlarged view of FIG. 5A.

The three-color decomposing one-dimension blazed diffraction grating is shown in Applied Optics, Vol. 17, No. 15, pages 2273-2279 (Aug. 1, 1978), and the shape thereof is shown in an enlarged view in FIG. 5B, which shows a sub-scan sectional view.

In the reflection type one-dimension blazed diffraction grating 3 shown in FIG. 5B, distances 16 and 15 (where the light is separated and focused) on the sensor plane 4 between the 0-order light 6 and the reflected, diffracted and separated ±1-order diffracted lights 7 and 5 are given by $$Z = l \times \tan\{\sin^{-1}(\pm \lambda/p + \sin\theta_0) - \theta_0\} \quad (1)$$

where $\lambda$ is a wavelength of the separated and focused information light, $\theta_0$ is an incident angle to the blazed diffraction grating 3, p is a grating pitch and l is a distance between the grating and the photosensing plane along an optical axis.

For example, where the reflection type blazed diffraction grating 3 is of stepped shape and a first step has a depth $h_1 = 909$ nm and a second step has a depth $h_2$ 32 1818 nm, then a center wavelength of the 0-order light is $\lambda_0 = 525$ nm, the wavelength of the $\pm 1$-order diffracted light is $\lambda_{+1} = 592$ nm, and the wavelength of the $-1$-order diffracted light is $\lambda_{-1} = 472$ nm. They follow the following formula.

$$\lambda = 2h_1 \cdot \cos\theta_0/m = 2h_2 \cos\theta/2m \quad (2)$$

where $\lambda_{+1}$ is calculated by $m = 3\frac{1}{3}$, $\lambda_{-1}$ is calculated by $m = 3 + \frac{1}{3}$, and $\lambda_0$ is calculated by $m = 3$ (approximated values for $\lambda \pm 1$).

Where the grating pitch of the diffraction grating is $p = 130$ μm, the grating - photosensing plane distance along the optical axis is $l = 45$ mm and the incident angle is $\theta_0 = 30$ degrees, then Z $\lambda_{+1} = 0.171$ mm and Z $\lambda_{-1} = -0.136$ mm.

Namely, the line-to-line distances 16 and 15 between the sensor line 9 (G) and the two other lines of the monolithic 3-line sensor 4 are selected to 0.171 mm for the +1-order light ($\lambda_{+1}$) (R) (that is, the distance 16 to the line 10), and 0.136 mm for the −1-order light ($\lambda_{-1}$) (B) (that is, the distance 15 to the line 8) so that the 3-line sensor 4 has asymmetric line-to-line distances. In this manner, an efficient color reader, which eliminates the need for the interpolating redundant memory described above, is provided.

In determining the center wavelengths of the respective order lights based on the relationship between the grating thicknesses $h_1$ and $h_2$ of the step and the center wavelengths of the respective order lights, m is set to 3 in the above example although any positive integer may be selected in principle. However, m is preferably no smaller than 3 because the shortage of the light intensity of the R and B components, in the present embodiment, likely occurs according to the 1-order diffraction efficiency. (Particularly when a lamp used for black body radiation, such as a halogen lamp, is used as the illumination light source, the shortage of the light intensity of the B component is likely occur.)

As described above, in accordance with the present invention, the color image reader comprises a 3-line sensor having three one-dimension sensor arrays arranged on one substrate with each array being spaced by a predetermined distance along a direction perpendicular to the array direction, a focusing optical system for focusing an image of an object onto the sensor, and a one-dimension blazed diffraction grating arranged in a light path between the focusing optical system and the sensor, closer to the sensor than to an exit pupil of the focusing optical system for spectroscopically separating a light from the object by a diffraction effect to color-decompose it into three colors perpendicularly to the array and directing the color-decomposed lights to the corresponding sensor arrays. Distances from a center sensor array of the 3-line sensor to two other sensor lines are different from each other.

Further, the distances from the center sensor array to the two other sensor arrays correspond to separation distances from the center sensor array on the 3-line sensor, which are primarily determined by a wavelength at a maximum diffraction efficiency of two ±1-order diffracted lights of the one-dimension blazed diffraction grating.

Figure 6:
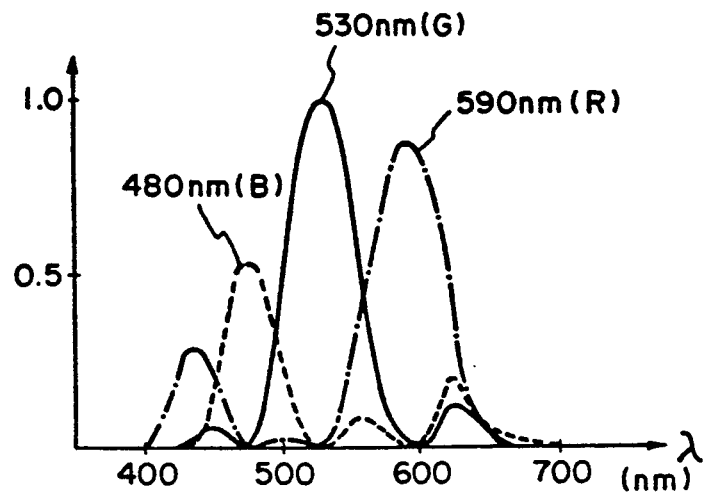
FIG. 6 shows a spectrum distribution of spectroscopically separated components in the first embodiment.

FIG. 6 shows a spectrum distribution of the spectroscopically separated components when the reflection type one-dimension blazed diffraction grating 3 of the present embodiment and a halogen lamp are used.

Figure 7:
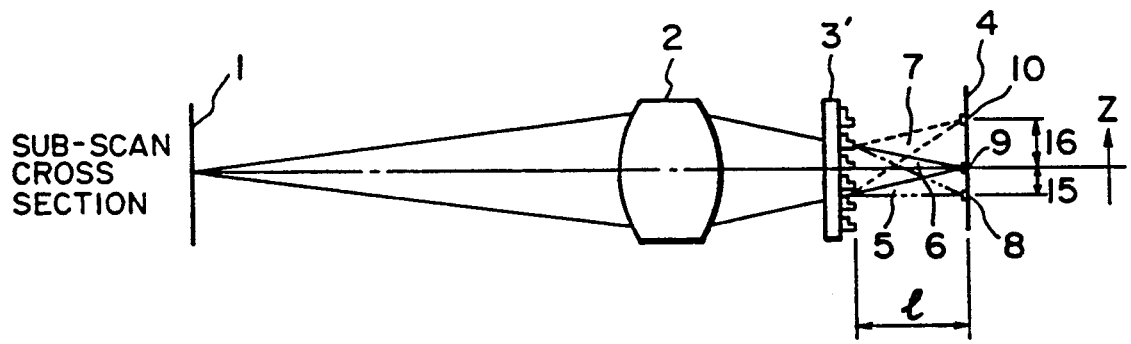
FIG. 7 shows a sub-scan sectional view of a second embodiment.

FIG. 7 shows a second embodiment of the color image reader of the present invention. It shows a sub-scan sectional view. In the first embodiment, the reflection type one-dimension blazed diffraction grating 3 is used to attain the three-color separation effect. In the second embodiment, a similar effect is attained by a transmission type one-dimension blazed diffraction grating 3'.

The like numerals to those shown in FIGS. 5A, 5B designate the like function elements or diffracted lights. The sensor plane of the sensor 4 is parallel to the line scan direction (sub-scan direction).

As shown in FIG. 6, where a diffraction grating 23 is arranged perpendicularly to the optical axis of the optical system, a relationship between the center wavelengths of the respective order diffracted lights and the shapes of the stepped grating is given by $$\lambda = (n\lambda - 1)h_1/m = (n\lambda - 1) \cdot h_2/2m \quad (3)$$

where the symbols are the same as those used for the first embodiment, $\lambda_0$ is determined by $m=3$, $\lambda_{+1}$ is determined by $m=3\frac{1}{3}$ and $\lambda_{-1}$ is determined by $m=3+\frac{1}{3}$, $n\lambda$ is a refractive index of the grating 23, and the formula gives approximated values for $\lambda \pm 1$.

If the center wavelength of the 0-order diffracted light is to be the same as that in the first embodiment, that is $\lambda_0 = 525$ nm, and $n \approx 1.5$, then $$h_1 = 3150 \text{ nm}, h_2 = 6300 \text{ nm}$$

From the formula (3), $\lambda_0 = 525$ nm, $\lambda_{+1} = 591$ nm and $\lambda_{-1} = 473$ nm. Thus, the center wavelengths of the G, R and B diffracted lights are substantially the same as those in the first embodiment. For the transmission type diffraction grating 23, the distances 6 and 15 on the sensor plane 4 spaced by the grating-photosensor plane distance l along the optical axis are given by $$Z = l \times \tan\{\sin^{-1}(\pm \lambda/p)\} \quad (4)$$

Like in the first embodiment, if the grating pitch is $p=0.18$ mm and the grating-photosensor plan l along the optical axis is $l=45$ mm, then $Z \lambda_{+1} = 0.148$ mm and $Z \lambda_{-1} = -0.118$ mm.

Thus, the line-to-line distances 16 and 15 between the sensor line 9 (G) and the two other lines of the monolithic 3-line sensor 4 are selected to 0.148 mm for the +1-order light ($\lambda_{+1}$) (R) (that is, the distance 16 to the line 10), and 0.118 mm for the −1-order light ($\lambda_{-1}$) (B) (that is, the distance 15 to the line 8) so that the 3-line sensor 4 has asymmetric line-to-line distances. In this manner, a similar effect to that of the first embodiment is attained.

In the transmission type one-dimension blazed diffraction grating 3', the grating thicknesses $h_1$ and $h_2$ are larger than those of the reflection type diffraction grating 3, accordingly, the easiness in manufacturing the grating is reduced but since the optical axis can be kept straight, the optical system is simplified.

In the first embodiment, the G component light having $\lambda_0 = 525$ nm is used for the 0-order diffracted light component 6. In general, the B component light which is likely short in terms of light intensity may be used as the 0-order diffracted light component to compensate for the shortage.

For example, in the reflection type one-dimension blazed diffraction grating 3, where the grating pitch P and the incident angle $\theta_0$ are same as those in the first embodiment and the stepped grating having the grating thicknesses $h_1 = 831$ nm and $h_2 = 1662$ nm are used, the center wavelengths of the respective order diffracted lights are determined by the formula (2) as follows.

$$\lambda_0 = 480 \text{ nm}, \lambda_{-1} = 540 \text{ nm and } \lambda_{+1} = 617 \text{ nm}$$

(where $\lambda_0$ is determined by $m=3$, $\lambda_{-1}$ is determined by $m=3\frac{1}{3}$ and $\lambda_{+1}$ is determined by $3\frac{2}{3}$).

Figure 8:
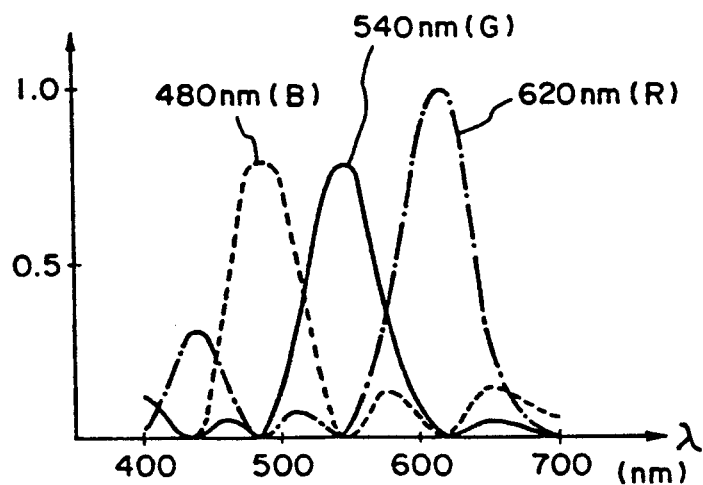
FIG. 8 shows a spectrum distribution of spectroscopically separated components in the second embodiment.

A spectrum distribution of the spectroscopically separated components when a halogen lamp is used as the light, source is shown in FIG. 8. As seen from FIG. 8, the B component light which is likely short compared the spectrum distribution of FIG. 6, is compensated for.

The line-to-line distances of the sensor are determined by the formula (1). The distance to the sensor line 9 (B) is 0.156 mm for the −1-order light ($\lambda_{-1}$) (G) (that is, the distance 15 to the line 8), and 0.178 mm for the +1-order light ($\lambda_{+1}$) (R) (that is, the distance 16 to the line 10).

In the above embodiments, the three-line sensor having the −1-order light sensor line (B), the 0-order light sensor line (G) and the +1-order light sensor line (R), and the three-line sensor having the −1-order light sensor line (G), the 0-order light sensor line (B) and the +1-order light sensor line (R) are used, although other combinations may be used. In any case, the distances from the center sensor array of the three-line sensor to two other sensor arrays are different from each other.

As described above, in accordance with the color image reader of the present invention, which reads the image information by the line scan, the monolithic 3-line sensor is arranged in parallel to the line scan direction (sub-scan sectional direction) and the color decomposing one-dimension blazed diffraction grating is mounted between the focusing optical system and the sensor plane to decompose the light into three color components. The light beams are separated and focused to the corresponding line sensors to color-read the image. The distances between the center line and the two other lines are asymmetric as determined by the grid configuration of the one-dimension blazed diffraction grating and the arrangement condition. As a result, high quality color reading is attained without the redundant line memory which is required in the conventional 3-line reading to interpolate the lines.

The present invention also suppresses, in principle, the color shift due to the mechanical vibration by the scan-reading which is likely to occur in the conventional 3-line reading.

What is claimed is:

1. An image reader comprising:
   a multi-line sensor having a plurality of one-dimension sensor arrays arranged on one substrate with different spacings between each adjacent pair of said one-dimension sensor arrays;
   a focusing optical system for focusing an object onto said sensor; and
   a blazed diffraction grating arranged in a light path between said focusing optical system and said sensor for color-decomposing the light from the object into a plurality of color component lights and directing the decomposed lights to corresponding sensor arrays.

2. An image reader according to claim 1 wherein said multi-line sensor comprises a monolithic 3-line sensor having three parallel one-dimension sensor arrays with a predetermined spacing therebetween.

3. An image reader according to claim 2 wherein the spacings from a center sensor array of the 3-line sensor to the two other sensor arrays are not equal.

4. An image reader according to claim 1 wherein said blazed diffraction grating is arranged closer to said sensor than to an exit pupil of said focusing optical system.

5. An image reader according to claim 1 wherein said blazed diffraction grating is a one-dimension blazed diffraction grating.

6. An image reader according to claim 1 wherein said blazed diffraction grating is a reflection type blazed diffraction grating.

7. An image reader comprising:
- a multi-line sensor having a plurality of one-dimension sensor arrays arranged on one substrate with different spacings between each adjacent pair of said one-dimension sensor arrays;
- a focusing optical system for focusing an object onto said sensor; and
- a blazed diffraction grating arranged in a light path between said focusing optical system and said sensor and adapted to separate the light from the object into a plurality of color components.

8. An image reader according to claim 7 wherein said multi-line sensor comprises a monolithic 3-line sensor having three parallel one-dimension sensor arrays with predetermined spacings therebetween.

9. An image reader according to claim 8 wherein the spacings from a center sensor array of the 3-line sensor to the two other sensor arrays are not equal.

10. An image reader according to claim 7 wherein said blazed diffraction grating is arranged closer to said sensor than to an exit pupil of said focusing optical system.

11. An image reader according to claim 7 wherein said blazed diffraction grating is a one-dimension blazed diffraction grating.

12. An image reader according to claim 7 wherein said blazed diffraction grating is a reflection type blazed diffraction grating.

* * * * *

UNITED STATES PATENT AND TRADEMARK OFFICE
CERTIFICATE OF CORRECTION

PATENT NO. : 5,223,703

DATED : June 29, 1993

INVENTOR(S) : MICHITAKA SETANI

It is certified that error appears in the above-identified patent and that said Letters Patent is hereby corrected as shown below:

COLUMN 1

Line 18, "array" should read --array,--.
    Line 22, "three-pieces" should read --three-piece--.
    Line 33, "functions" should read --function--.

COLUMN 2

Line 45, "sensor," should read --sensor--.
    Line 46, "sensor" should read --sensor,--.

COLUMN 3

Line 44, "closer where it is" should read --where it is closer--.

COLUMN 4

Line 5, "$h_2 32$" should read --$h_2 =$ --.
    Line 13, "$m = 3⅛,$" should read --$m = 3 - ⅛$,--.
    Line 40, "ciency. (Particularly" should read --ciency (particularly--.
    Line 43, "occur.)" should read --to occur).--.

UNITED STATES PATENT AND TRADEMARK OFFICE
CERTIFICATE OF CORRECTION

PATENT NO. : 5,223,703

DATED : June 29, 1993

INVENTOR(S) : MICHITAKA SETANI

It is certified that error appears in the above-indentified patent and that said Letters Patent is hereby corrected as shown below:

COLUMN 5

Line 14, "or" should read --of--.
    Line 27, "m = 3⅓," should read --m = 3 - ⅓,--.
    Line 40, "distances 6" should read --distances 16--.
    Line 46, "plan 1" should read --plane 1--.
    Line 62, "3, accordingly," should read
--3. Accordingly,--.
    Line 63, "reduced" should read --reduced,--.

COLUMN 6

Line 14, "3 2/3" should read --m = 3 - 2/3 --.
"m = 3¾ " should read --m = 3 - ¾ --
    Line 18, "light" should read --light,--.
    Line 19, "the" should read --to the--.
    Line 39, "color decom." should read --color-decom--.

Signed and Sealed this

Twenty-sixth Day of April, 1994

Attest:

BRUCE LEHMAN

*Attesting Officer*     *Commissioner of Patents and Trademarks*